US007742462B2

(12) United States Patent
Takeuchi

(10) Patent No.: US 7,742,462 B2
(45) Date of Patent: Jun. 22, 2010

(54) CD-ROM ON WHICH A PROGRAM FOR FUNCTIONING AS AN IP TELEPHONE TERMINAL IS RECORDED, MANAGEMENT SERVER, OPERATION SERVER, AND IP TELEPHONE TERMINAL SETUP METHOD

(76) Inventor: Yoji Takeuchi, 6-2-11-102, Isobe, Mihama-Ku, Chiba-Shi, Chiba Ken (JP)

( * ) Notice: Subject to any disclaimer, the term of this patent is extended or adjusted under 35 U.S.C. 154(b) by 1189 days.

(21) Appl. No.: 11/092,702

(22) Filed: Mar. 30, 2005

(65) Prior Publication Data

US 2005/0220083 A1   Oct. 6, 2005

(30) Foreign Application Priority Data

Mar. 30, 2004 (JP) ............................. 2004-129001
Jan. 25, 2005 (JP) ............................. 2005-017111

(51) Int. Cl.
| H04L 12/16 | (2006.01) |
| H04L 12/66 | (2006.01) |
| H04L 12/28 | (2006.01) |
| H04L 12/56 | (2006.01) |
| H04Q 11/00 | (2006.01) |
| H04M 1/64 | (2006.01) |
| H04M 1/00 | (2006.01) |
| H04M 3/00 | (2006.01) |
| G06F 15/16 | (2006.01) |

(52) U.S. Cl. .................. 370/352; 370/259; 370/260; 370/261; 370/262; 370/271; 370/353; 370/354; 370/355; 370/356; 370/395.2; 379/88.17; 379/355.01; 709/209

(58) Field of Classification Search ........... 370/352, 370/353, 354, 355, 356, 395.02; 709/229; 379/88.17, 355.01, 900

See application file for complete search history.

(56) References Cited

U.S. PATENT DOCUMENTS 5,457,746 A * 10/1995 Dolphin ...................... 705/51

(Continued)

FOREIGN PATENT DOCUMENTS

JP      11-265277      9/1999

(Continued)

OTHER PUBLICATIONS

Herzberg, Sven. "Announcement: GNOPPIX 0.5.4-1". Gnome-Announce-List. Sep. 2003.*

(Continued)

*Primary Examiner*—Daniel J Ryman
*Assistant Examiner*—Andrew Oh
(74) *Attorney, Agent, or Firm*—Young & Thompson

(57) ABSTRACT

A CD-ROM that records programs for setting up a general-purpose computer as an IP telephone terminal by using a CPU, a memory, an input, a network card, a sound card, and a CD-ROM drive except an HD drive, the program including parts for: making the computer start to deploy the programs in the CD-ROM over the memory by a CD-ROM boot method without booting from an HD; making the computer obtain user identification data respectively and correspondingly inputted by the users through the input; making the computer send the user identification data to a management server via a network based on a location data recorded onto the CD-ROM; making the computer receive an IP telephone terminal setup data sent from the management server via the network; and making the computer function as an IP telephone terminal by setting up the computer as such.

10 Claims, 10 Drawing Sheets

U.S. PATENT DOCUMENTS

| | | | | |
|---|---|---|---|---|
| 5,862,104 | A * | 1/1999 | Matsumoto | 369/7 |
| 6,076,103 | A * | 6/2000 | Sakai | 709/217 |
| 6,487,601 | B1 * | 11/2002 | Hubacher et al. | 709/229 |
| 6,622,158 | B1 * | 9/2003 | Koyata et al. | 709/203 |
| 6,873,877 | B1 * | 3/2005 | Tobias et al. | 700/94 |
| 6,958,992 | B2 * | 10/2005 | Lee et al. | 370/352 |
| 7,047,302 | B1 * | 5/2006 | Chatani et al. | 709/229 |
| 7,065,653 | B1 * | 6/2006 | Yoneda | 713/193 |
| 7,099,301 | B1 * | 8/2006 | Sheu | 370/352 |
| 7,197,234 | B1 * | 3/2007 | Chatterton | 386/95 |
| 7,260,304 | B1 * | 8/2007 | Harradine et al. | 386/46 |
| 2002/0037735 | A1 * | 3/2002 | Maggenti et al. | 455/517 |
| 2002/0052847 | A1 * | 5/2002 | Shioda et al. | 705/51 |
| 2002/0078376 | A1 * | 6/2002 | Miyoshi et al. | 713/200 |
| 2002/0080960 | A1 * | 6/2002 | Kanayama et al. | 380/201 |
| 2002/0103718 | A1 * | 8/2002 | Matsuda et al. | 705/26 |
| 2002/0103855 | A1 * | 8/2002 | Chatani | 709/203 |
| 2002/0124245 | A1 * | 9/2002 | Maddux et al. | 717/176 |
| 2002/0131402 | A1 * | 9/2002 | Lee et al. | 370/352 |
| 2002/0138445 | A1 * | 9/2002 | Laage et al. | 705/67 |
| 2002/0150227 | A1 * | 10/2002 | Abraham | 379/218.02 |
| 2003/0009682 | A1 * | 1/2003 | Wallace et al. | 713/193 |
| 2003/0012147 | A1 * | 1/2003 | Buckman et al. | 370/260 |
| 2003/0028892 | A1 * | 2/2003 | Gewickey et al. | 725/110 |
| 2003/0046557 | A1 * | 3/2003 | Miller et al. | 713/186 |
| 2003/0220091 | A1 * | 11/2003 | Farrand et al. | 455/404.1 |
| 2004/0006607 | A1 * | 1/2004 | Kanada et al. | 709/219 |
| 2004/0059781 | A1 * | 3/2004 | Yoakum et al. | 709/204 |
| 2004/0105433 | A1 * | 6/2004 | Seo | 370/352 |
| 2004/0128145 | A1 * | 7/2004 | Sato | 705/1 |
| 2004/0202188 | A1 * | 10/2004 | Hou et al. | 370/401 |
| 2005/0086326 | A1 * | 4/2005 | Manning et al. | 709/219 |
| 2005/0129002 | A1 * | 6/2005 | Koo | 370/352 |
| 2007/0064918 | A1 * | 3/2007 | Son | 379/355.01 |

FOREIGN PATENT DOCUMENTS

| | | |
|---|---|---|
| JP | 2001-147814 | 5/2001 |
| JP | 2003-046679 | 2/2003 |
| JP | 2004-054752 | 2/2004 |

OTHER PUBLICATIONS

Knopper, Klaus. "Building a self-contained auto-configuring Linux system on an iso9660 filesystem". USENIX. 2000.*

Laird, Cameron. "Knoppix gives bootable, one-disk Linux". IBM. 04, Feb. 2003.*

Laird, Cameron. "Knoppix gives bootable, one disk Linux". IBM, Feb. 4, 2003.*

* cited by examiner

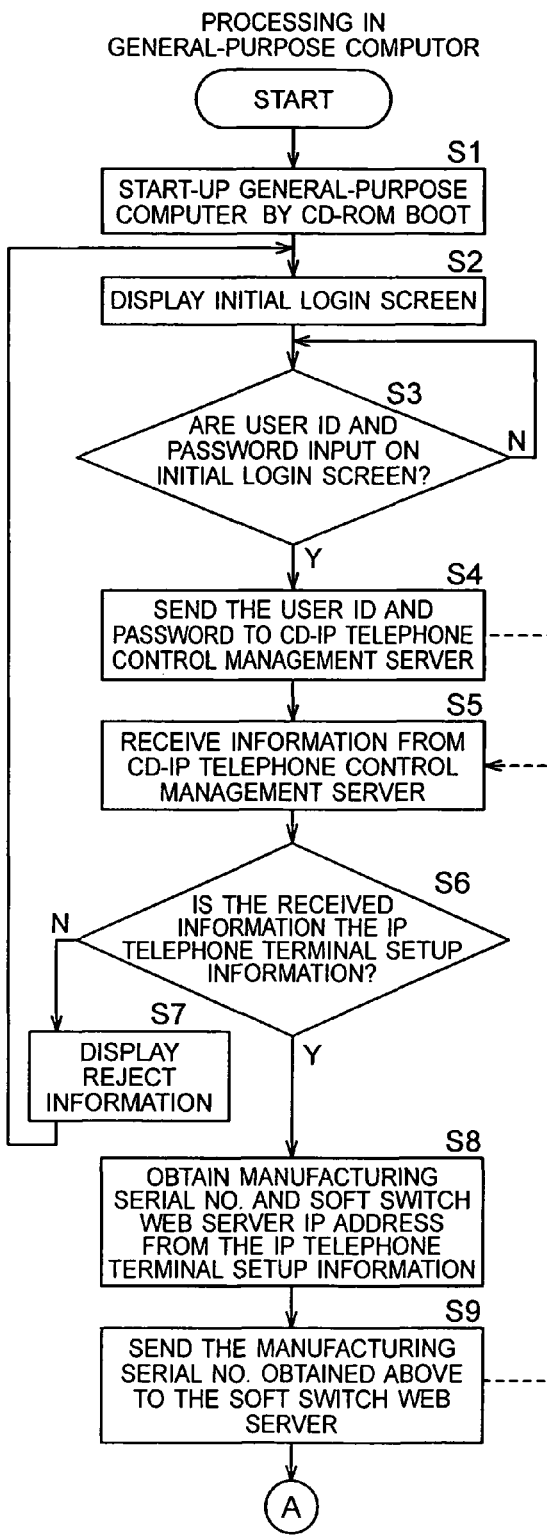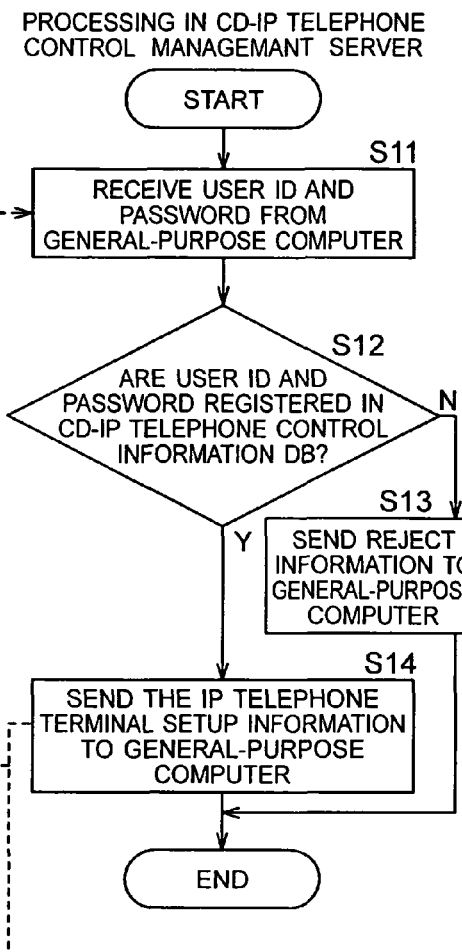

INITIAL LOGIN SCREEN

GENERAL BROWSER SCREEN

FIG. 8A
SCREEN BEFORE MAKING OUTBOUND CALL

| BROWSER (1) | BROWSER (2) | BROWSER (3) | BROWSER (4) | BROWSER (5) | TELEPHONE DIRECTORY |

CD-IP TELEPHONE SUBSCRIBER
NAME: x x x x x x x x x ————————
NAME: x x x x x x x x x ————————
NAME: x x x x x x x x x ————————

GENERAL TELEPHONE SUBSCRIBER(VIA GATEWAY)
NAME: x x x x x x x x x ————————
NAME: x x x x x x x x x ————————
NAME: x x x x x x x x x ————————

CALL CENTER (VIA GATEWAY)
CALL CENTER CHIBA ————————
CALL CENTER TOKYO ————————
CALL CENTER YOKOHAMA ————————

FIG. 8B
SCREEN AFTER MAKING OUTBOUND CALL

| BROWSER (1) | BROWSER (2) | BROWSER (3) | BROWSER (4) | BROWSER (5) | 61e | TELEPHONE DIRECTORY |

CD-IP TELEPHONE SUBSCRIBER  61c
NAME: x x x x x x x x x ————————  —61
NAME: x x x x x x x x x ————————  —61d
NAME: x x x x x x x x x ————————
( Call )  ( End )  —61b GENERAL TELEPHONE SUBSCRIBER(VIA GATEWAY)
NAME: x x x x x x x x x ————————  —61a
NAME: x x x x x x x x x ————————
NAME: x x x x x x x x x ————————

CALL CENTER (VIA GATEWAY)
CALL CENTER CHIBA ————————
CALL CENTER TOKYO ————————
CALL CENTER YOKOHAMA ————————

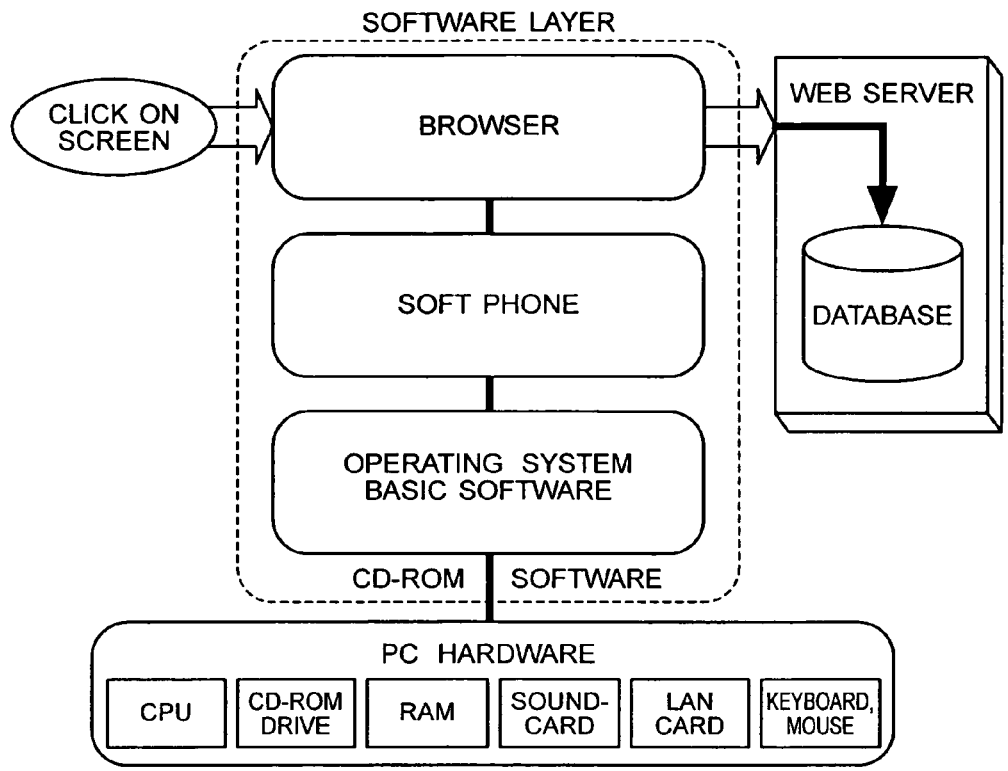

FIG. 10A
WITHOUT UPnP SUPPORT
FIG. 10B
WITH UPnP SUPPORT
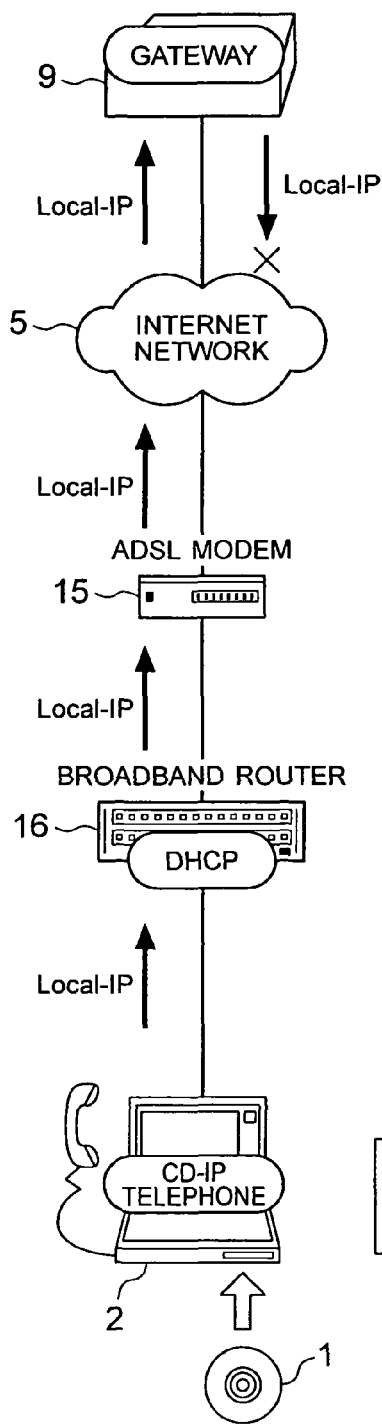
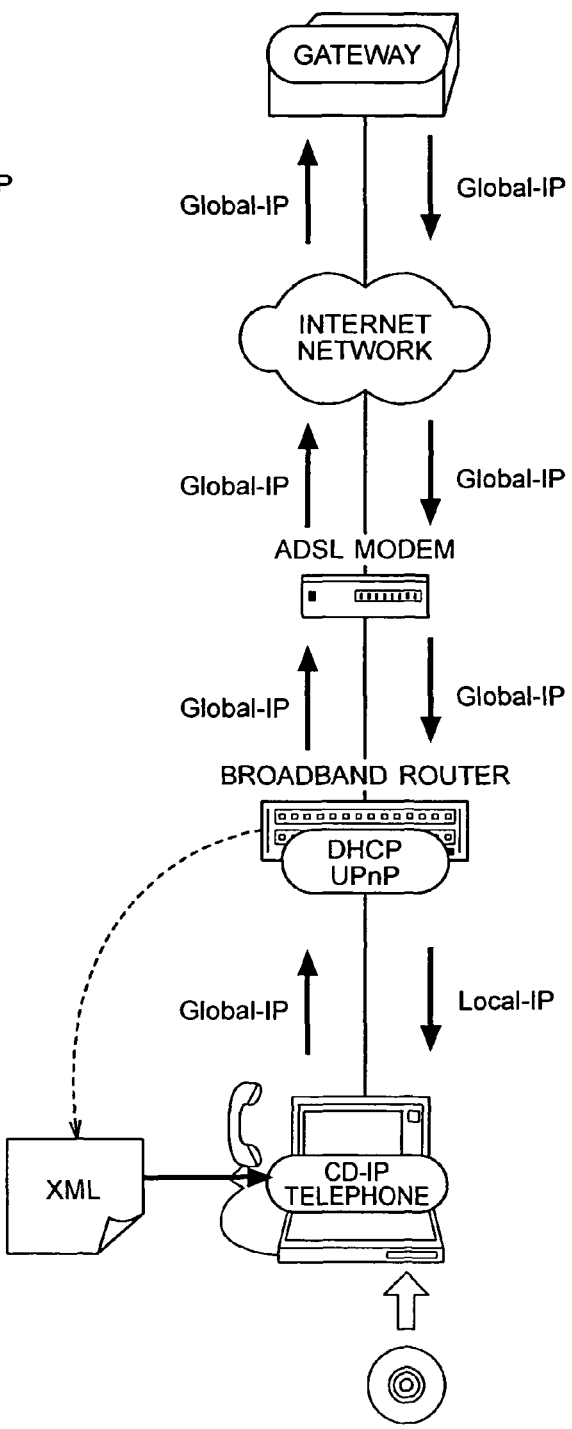

CD-ROM ON WHICH A PROGRAM FOR FUNCTIONING AS AN IP TELEPHONE TERMINAL IS RECORDED, MANAGEMENT SERVER, OPERATION SERVER, AND IP TELEPHONE TERMINAL SETUP METHOD

BACKGROUND OF THE INVENTION

1. Field of the Invention

The present invention relates to a technology field enabling a voice call between two parties on the Internet by using a general-purpose computer such as a personal computer (PC) as an IP (Internet Protocol) telephone terminal.

2. Related Art

In recent years, an IP telephone system has been focused on in the usage of VoIP (Voice over IP) technology in realizing voice call by means of IP packets, with considerable reasons such as reducing call toll for the public stationed telephones and so on. In the functional aspect of this IP telephone system, various proposals are made.

For example, Japanese Unexamined Patent Publication No. JP-A-2003-169135, which is hereby incorporated for reference, discloses a VoIP communication system, in which IP telephone terminals for conducting a VoIP call can mutually call by designating their telephone numbers without noticing their IP addresses being dynamically assigned at the time of dial-up connection, and in which it is assured that an IP address of a called destination party has the correct IP address when the called IP telephone terminal is inquired with a GateKeeper by designating the telephone number.

However, in such an IP telephone system, it is generally necessary to prepare an IP telephone terminal hardware or an adapter having VoIP functionality. Therefore, users should prepare a new hardware by spending a further expense. Further, a user is required to install to a PC for example an application with VoIP call functionality. For doing this, it is necessary for the user to do a difficult environmental configuration setup on such Windows (registered trade mark) operating system. However, the users like elderly people, in particular, feel it hard to use such a system.

SUMMARY OF THE INVENTION

The present invention is provided in consideration of the above. An objective of the present invention is to provide a CD-ROM, a management server, an operation server, and an IP telephone terminal setup method which can demonstrate an IP call function necessary and sufficient for voice IP call between two parties on the Internet in IP call connection with ease and at low cost, and which can demonstrate a browsing function on the IP telephone terminal necessary and sufficient when displaying the page information of a Internet web site at the same time.

According to the first aspect of the present invention, there is provided a CD-ROM having programs (such as OS, applications for example) recorded to set up a general-purpose computer as an IP (Internet Protocol) telephone terminal by using at least a CPU (Central Processing Unit), a memory, an input means, a network card, a sound card, and a Compact Disk-Read Only Memory (CD-ROM) drive except an HD (Hard Disk) drive, comprising:

apart for making a general-purpose computer get started by initiating the general-purpose computer with the CD-ROM set at the CD-ROM drive (for example, by turning on the power) to deploy the program recorded on the CD-ROM over the memory by the CD-ROM boot method without a hard disk;

a part for making the general-purpose computer obtain a user identification data which respectively corresponds to users and which is inputted by a user through the input means;

a part for making the general-purpose computer send thus obtained user identification data to a management server via a network, based on a location data (for example, an IP address) recorded on the CD-ROM to designate the location of the management server;

a part for making the general-purpose computer receive an IP telephone terminal setup data including an IP telephone terminal identification data uniquely corresponding to the user identification data which is sent from the management server via the network; and a part for making the general-purpose computer function as an IP telephone terminal by setting up the general-purpose computer as an IP telephone terminal with the programs without the HD drive.

According to the second aspect of the present invention there is provided the CD-ROM according to the first aspect, wherein a location data (for example, an IP address) is included in the IP telephone terminal setup data, in order for designating a location of an operation server used for telephone switching, and further including:

a part for making the CPU send the IP telephone terminal identification data to the operation server via the network, based on the location data of the operation server in order to register the general-purpose computer as the IP telephone terminal.

According to the third aspect of the present invention, there is provided the CD-ROM according to the second aspect, wherein further comprising:

a part for making the IP telephone terminal obtain from the operation server a call designation data for designating either another IP telephone terminal which is connected to the network and registered in the operation server or a public stationed telephone (for example, such as a public fixed-line telephone, a cellular telephone and so on) which is connected to the network via a gateway and registered in the operation server; and a part for making the IP telephone terminal display the call designation data on its browser, in order for the user to be able to select the call designation data with the input means.

According to the fourth aspect of the present invention there is provided the management server connected to the general-purpose computers via the network, which are started up by the CD-ROMs according to any one of the first to third aspects, comprising:

a database for registering a plurality of the user identification data and the IP telephone terminal identification data corresponding to each of the specific user identification data; and setup data transmission means for the management server to send via the network the IP telephone terminal setup data including the IP telephone terminal identification data, comprising:

a part for making the management server receive the user identification data sent from the general-purpose computer via the network; and a part for making the management server obtain from the database the IP telephone terminal identification data respectively corresponding to the user identification data.

According to the fifth aspect of the present invention, there is provided the operation server connected via the network to the general-purpose computers started up by the CD-ROMs according to the second or third aspect comprising:
- a database for registering a plurality of the IP telephone terminal identification data and the call designation data corresponding to each of the IP telephone terminal identification data; and
- registration means for registering the general-purpose computer as the IP telephone terminal in case that the IP telephone terminal identification data is registered in the database, comprising:
- a part for making the operation server receive the IP telephone terminal identification data sent from the general-purpose computer via the network.

According to the sixth aspect of the present invention, there is provided the operation server according to the fifth aspect, further comprising:
- transmission means of the designated data for sending the call designation data registered in the call designation data control database via the network toward the general-purpose computer registered as the IP telephone terminal.

According to the seventh aspect of the present invention, there is provided an IP-telephone terminal setup method to register as an IP telephone terminal using a general-purpose computer including at least a CPU, a memory, an input means, a network card, a sound card, and a CD-ROM drive comprising steps of:
- making the CD-ROM be set at the CD-ROM drive to allow the general-purpose computer function as the IP telephone terminal with the program recorded on the CD-ROM without using a hard disk;
- making the general-purpose computer start to deploy the program recorded on the CD-ROM over the memory without a hard disk in the way of CD-ROM boot at the timing of command to initiate the general-purpose computer;
- making the general-purpose computer obtain a user identification data corresponding to respective users, which is input by a user through the input means;
- making the general-purpose computer send thus obtained user identification data to a management server via a network, based on a location data recorded on the CD-ROM as the location information of the management server;
- making the management server receive the user identification information sent from the general-purpose computer via the network;
- making the management server send to the general-purpose computer via a network both of an IP telephone terminal identification data uniquely corresponding to the user identification data and an IP telephone terminal setup data including a location data designating the location of an operation server to conduct a telephone switching processing;
- making the CPU of the general-purpose computer receive the IP telephone terminal setup data sent from the management server via the network; and
- making the CPU of the general-purpose computer send the IP telephone terminal identification data to the operation server via the network based on the location information of the operation server, in order to register the general-purpose computer as the IP telephone terminal.

According to the above aspects of the present invention, the following plural effective advantages are provided. According to the above aspects of the present invention, since the general-purpose computer can be used as the IP telephone terminal and exclusively dedicated hardware is not required, the hardware is procurable with ease, so that the IP telephone terminal can be built at a lower cost by just that less. Especially, an effective use of secondhand personal computer has a big potential.

According to the above aspects of the present invention, since the general-purpose computer can be used as the IP telephone terminal and it is possible to realize a larger display screen than that of a general IP telephone terminal, a wide range of usage is expected such as a browser telephone terminal and a TV telephone terminal and so on.

According to the above aspects of the present invention, since the HD drive is not necessarily used in the IP telephone terminal, the number of used parts can be reduced and parts failures are reduced by just that less. Further, even though the HD drive is in failure, the IP telephone terminal can possibly work.

According to the above aspects of the present invention, since the HD drive is not necessarily used in the IP telephone terminal, there is no chance to write data or the like. Eventually, the IP telephone terminal has strength against forgotten erasure of confidential information and the IP telephone terminal has strength against exploitation of information on malicious purpose.

According to the above aspects of the present invention, since the CD-ROM is used as a boot disk to start up the general-purpose computer as the IP telephone terminal, it is impossible to overwrite data thereon and data loss does not happen, so that the IP telephone terminal is strong in its security.

According to the above aspects of the present invention, since the CD-ROM is used as a boot disk to start up the general-purpose computer as the IP telephone terminal, the CD-ROM has the biggest capacity among boot-up memory media and a large amount of device drivers can be stored on the CD-ROM, so that the CD-ROM can be used for various kinds of general-purpose computers.

According to the above aspects of the present invention, since the CD-ROM is used as a boot disk to start up the general-purpose computer as the IP telephone terminal, the CD-ROM is convenient to hand-carry and easy to handle. On a business trip, for example, the traveler can boot a general-purpose computer with the CD-ROM to use as an IP telephone terminal.

According to the above aspects of the present invention, since the CD-ROM is used as a boot disk to start up the general-purpose computer as the IP telephone terminal, the CD-ROM is changeable and the CD-ROM can support a program update without causing a hardware loss unlike the IP telephone hardware terminal in general.

According to the above aspects of the present invention, since the CD-ROM is used as a boot disk to start up the general-purpose computer as the IP telephone terminal, a manufacturing serial number can be given to the CD-ROM of every IP telephone terminal in order to uniquely identify the terminal with the IP telephone terminal identification information. A browser function is available at the same time so that the IP telephone terminal can be specialized as a uniquely identifiable IP telephone terminal with capability to receive an incoming IP call.

According to the above aspects of the present invention, since the CD-ROM is used as a boot disk to start up the general-purpose computer as the IP telephone terminal, the CD-ROM has a capability to show a dummy display to make the data unreadable even though someone tries to read out the data recorded on the CD-ROM, for example, in the Windows (registered trade mark) environment while the general-purpose computer is not started up by the CD-ROM boot. Eventually, the CD-ROM can have effectiveness to prevent from the reverse engineering.

According to the above aspects of the present invention, since all of the IP telephone terminal information is centrally controlled in the management server, it is possible to realize a mechanism to provide to all of the terminals with a manufacturing serial number as the individual IP telephone terminal information, although the data contents recorded on the CD-ROM are uniformly copied.

According to the above aspects of the present invention, since it is possible to send and receive a call from one IP telephone terminal to another IP telephone terminal and the all-time connection service is generally available for the Internet, a telephone charge can be at the same rate regardless to the call distance and regardless to the call volume.

According to the above aspects of the present invention, since it is possible to make a call from the IP telephone terminal to the public stationed telephone, And the public stationed telephone call between the Gateway and the public stationed telephone can be a local call, so that the telephone toll can be reduced.

According to the above aspects of the present invention, since it is possible to make a call from the public stationed telephone to the IP telephone terminal, And the IP telephone number is associated with the manufacturing serial number given to the CD-ROM, so that the call can arrive at the specifically fixed IP telephone terminal with a certain IP telephone number regardless the connection point between the IP telephone terminal and the Internet.

According to the above aspects of the present invention, since the IP telephone terminal utilizes the Internet as a fundamental communication network and a generally widespread network is available, so that it is possible to keep the toll charge at the low rate or it is possible to provide the as-you-like call service.

According to the above aspects of the present invention, since the IP telephone terminal utilizes the Internet as a fundamental communication network and it is possible to locate the IP telephone terminals and the management server at any locations on the Internet, so that it is easy to move the operation locations.

According to the above aspects of the present invention, since the IP telephone terminal uses a router in UPnP (Universal Plug and Play) specification for connecting with the Internet of a fundamental communication network, it is possible for the router to connect with plural IP telephone terminals at a single point of connection with the Internet.

According to the above aspects of the present invention, since the IP telephone terminal uses a router in DHCP (Dynamic Host Configuration Protocol) specification for connecting with the Internet of a fundamental communication network, it is possible for the router to connect with plural IP telephone terminals without fixedly assigning the local IP addresses to the IP telephone terminals.

BRIEF DESCRIPTION OF THE DRAWINGS

In the accompanying drawings:

FIG. 3A is a flowchart showing a processing for a general-purpose computer;

FIG. 3B is a flowchart showing a processing for a CD-IP Telephone Control Management Server 6;

FIG. 8A is an example of the telephone directory screen in a general-purpose computer before making an outgoing call;

FIG. 8B is an example of the telephone directory screen in a general-purpose computer after making an outgoing call;

FIG. 9A is an example of an integration structure for software;

FIG. 9B is an example of an HTML description for making an outgoing call;

FIG. 10A is an example of schematic picture without UPnP support; and

FIG. 10B is an example of schematic picture with UPnP support.

DESCRIPTION OF THE PREFERRED EMBODIMENTS

Figure 1:
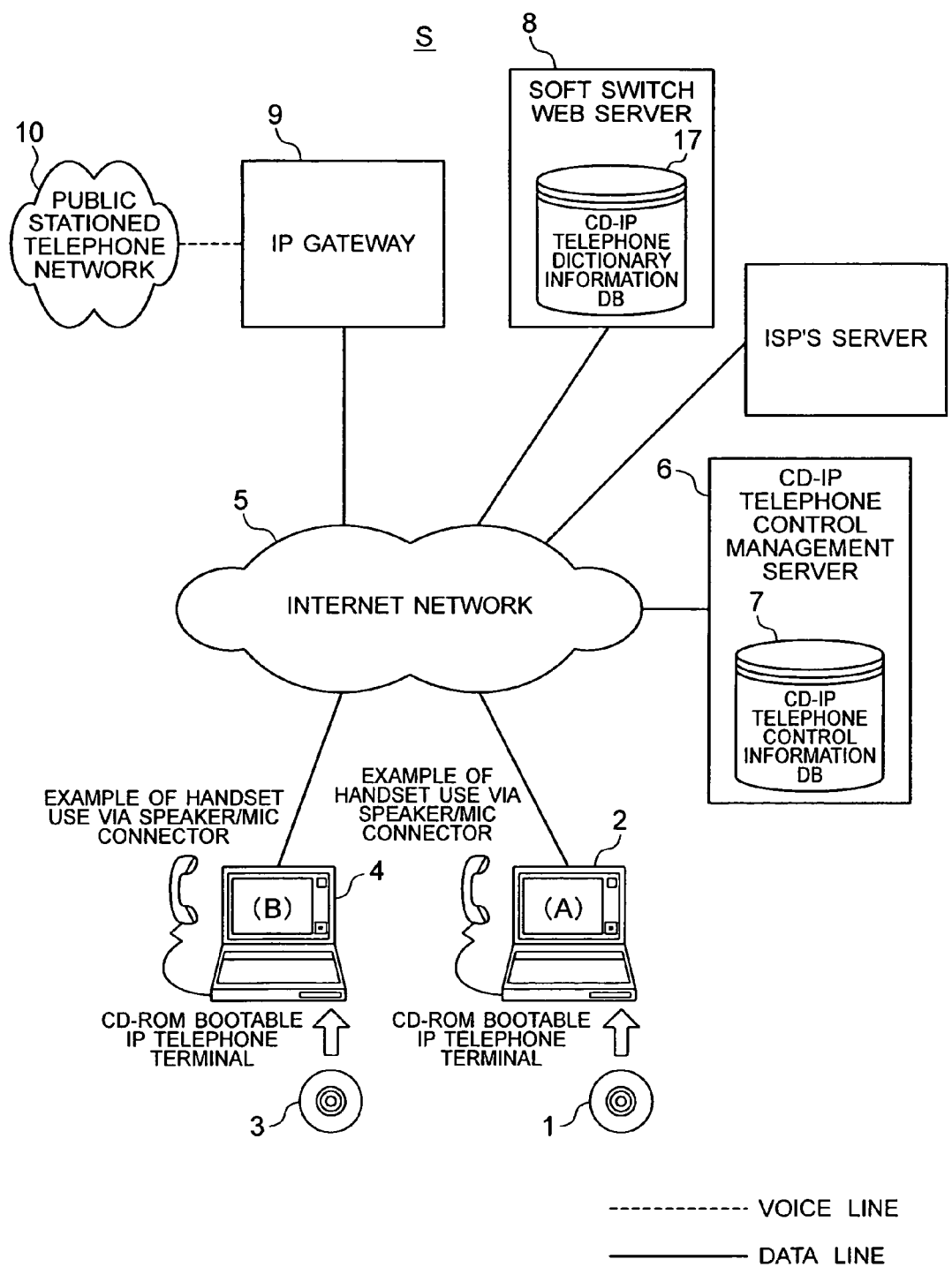
FIG. 1 is an example of an overview configuration of the next-generation IP telephone system.

Preferred embodiments of the present invention will be described in conjunction with the FIGS. 1 to 10. Meanings of the reference numbers in the drawings are as follows: 1: CD-ROM for CD-IP Telephone, 2: CD-ROM Bootable IP Telephone Terminal A (herein after referred to as a "CD-IP Telephone Terminal A"), 3: CD-ROM for CD-IP Telephone, 4: CD-ROM Bootable IP Telephone Terminal B (hereinafter referred to as a "CD-IP Telephone Terminal B"), 5: Internet Network, 6: CD-IP Telephone Control Management Server, 7: CD-IP Telephone Control Information Database, 8: Soft Switch Web Server, 9: IP Gateway, 10: Public Stationed Telephone Network, 11: Built-in Speaker/Built-in Mic, 12: External Speaker/External Mic, 13: Headset-type Speaker/Headset-type Mic, 14: Handset-type Speaker/Handset-type Mic, 15: ADSL Modem, 16: Broadband Router, 17: CD-IP Telephone Directory Information Database, and S: Next-Generation IP Telephone System.

The embodiments described below are cases where the present invention is applied to the next-generation IP telephone system. The next-generation IP telephone system is a system to conduct a communication with a CD-ROM bootable IP telephone (hereinafter referred to as "CD-IP Telephone").

First, in reference to FIG. 1, a brief explanation will be given regarding to a structure and a function of the Next-Generation IP Telephone System S.

FIG. 1 shows an example of a schematic structure of the next-generation IP telephone system.

As shown in FIG. 1, the Next-Generation IP Telephone System S includes: plural telephone terminals (which means two terminals in this embodiment for example) such as the CD-IP Telephone Terminal A 2 and the CD-IP Telephone Terminal B 4, the CD-IP Telephone Control Management Server 6 as a management server in the present invention, the Soft Switch Web Server 8 as an operation server in the present invention, the IP Gateway 9, and so on. Those constitutional elements are connected to the Internet Network 5 as a network.

The CD-IP Telephone Terminal A 2 and Terminal B 4 respectively include a general-purpose computer such as a PC equipped with a CD-ROM drive. Each of the general-purpose computers has a CD-ROM drive where the CD-ROM 1 or 3 of the present invention is set, and get started by way of CD-ROM boot. Furthermore, the CD-IP telephone terminals connectively work with the CD-IP Telephone Control Management Server 6 and the Soft Switch Web Server 8. Eventually, the general-purpose computer starts to function as an IP telephone terminal (or to be a dedicated-purpose terminal for IP telephony) without using an HD drive (or with an HD drive not being required).

The CD-ROM 1 and CD-ROM 3 respectively loaded in the general-purpose computers has a manufacturing serial number as an example of unique IP telephone terminal identification information. However, the identical contents (or the identical recording information) are recorded on the recording area on the CD-ROM, and the CD-ROMs themselves are simply and physically duplicated ones. Using the program recorded on the CD-ROM, the general-purpose computer connectively works with the CD-IP Telephone Control Management Server 6, making the general-purpose computer itself obtain the unique manufacturing serial number that the CD-ROM originally has. And the general-purpose computer becomes usable as an individual IP telephone terminal.

The CD-IP Telephone Control Management Server 6 includes for example a server computer and has a CD-IP Telephone Control Information Database (DB) 7 where a CD-IP telephone control information data is registered as an IP telephone terminal setup information data, in order for the server to individually recognize and manage the above IP telephone terminal. The CD-IP telephone control information includes, for example, a user ID and a password as a sample of information identifying plural users, a manufacturing serial number uniquely corresponding to each of the user IDs, an IP address of the Soft Switch Web Server 8, an URL (Uniform Resource Locater) name of the Soft Switch Web Server 8, and so on.

The CD-IP Telephone Control Management Server 6 has a function to provide a manufacturing serial number which works as an individually-recognizing ID to each of the general-purpose computers, when the general-purpose computers are started up by way of CD-ROM boot. In this function, it becomes possible to realize a CD-IP telephone terminal getting a unique ID during the startup stage with the CD-ROM which are merely and physically duplicated.

Further, when the CD-IP telephone terminal is once started up, the control is transferred from the CD-IP Telephone Control Management Server 6 to the Soft Switch Web Server 8, and all the further operation is handled by an inter-working between the CD-IP telephone terminal and the Soft Switch Web Server 8.

The Soft Switch Web Server 8 includes for example a server computer and has a CD-IP Telephone Directory Information Database (DB) 17 where the CD-IP Telephone Directory Information is registered for the purpose of operating the telephone switching after the general-purpose computer is started up (or set up) as the CD-IP telephone terminal. In this CD-IP telephone directory, information is included such as, for example, plural manufacturing serial numbers, the latest IP address of a CD-IP telephone terminal respectively associated to each of the serial number (for example, which is assigned by the Internet Service Provider (ISP) server, when the telephone terminal is connected to the Internet), call designation information, and so on.

The call designation information is the information for designating a call to a CD-IP telephone terminal connected with the Internet Network 5 or designating a call to a telephone connected with the Internet Network 5 via the IP Gateway 9, (for example, which is a telephone set, hereinafter referred to as "public stationed telephone" such as a fixed-line telephone, a PBX extension telephone, a public pay telephone, and a cellular phone, other than an IP telephone terminal) For example, in the call designation information, in case of a CD-IP telephone terminal, there included owner data such as the owner name of the CD-IP telephone terminal and the Internet telephone number to enable an incoming call to the CD-IP telephone terminal via the IP Gateway 9. In case of a public stationed telephone, there included owner data such as the owner name of the public stationed telephone and a public stationed telephone number (or a telephone number via a gateway) which is necessary for calling from the CD-IP telephone terminal to the public stationed telephone. In such a public stationed telephone case, however, such information will be registered instead of the manufacturing serial number to indicate the connected IP gateway (for example in numbers).

The Soft Switch Web Server 8 resembles to the GateKeeper in H.323 standard but differs from the GateKeeper in an aspect of the functions. The Soft Switch Web Server 8 is an operation server which can control an unlimited number of the CD-IP telephone terminals and which can make an outgoing call in combination with a display function between a web server and a browser, at the same time. Further, in the Soft Switch Web Server 8, the IP addresses and the Internet telephone numbers are respectively assigned to every port of the IP Gateway 9 in a similar manner to that in the CD-IP telephone terminals.

The IP Gateway 9 is connected to the Public Stationed Telephone Network 10 and is used when making a call to a public stationed telephone which is connected to the Public Stationed Telephone Network 10. Therefore, it is possible to understand that plural lines are aggregated to be a single device of gateway and that the device connectively works with the public stationed telephone network.

Next, in reference to FIG. 2, a hardware configuration will be described for the CD-IP telephone terminals.

Figure 2:
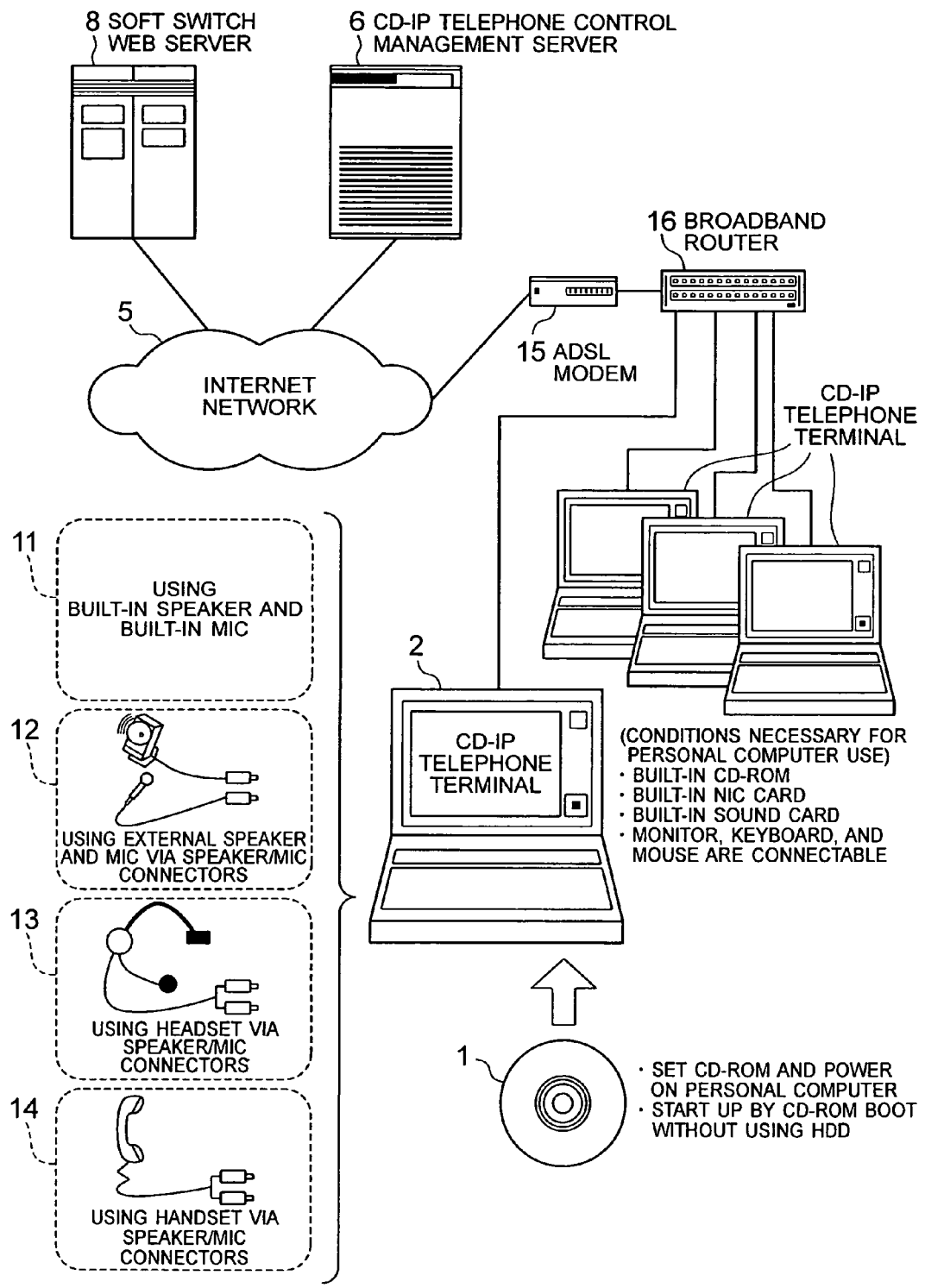
FIG. 2 is an example of a hardware configuration with general-purpose computers.

FIG. 2 shows a sample of a hardware configuration with a general-purpose computer.

In this embodiment, the general-purpose computer used as the CD-IP telephone terminal is an IBM-AT compatible PC equipped with a CPU, a memory such as RAM, an input means such as a keyboard and a mouse, a display means such as a monitor, a network card such as a network interface card (NIC), a sound card, the Built-in Speaker and Mic 11. An HD drive is not necessarily required as a piece of parts.

Further, as shown in FIG. 2, instead of the Built-in Speaker and Mic 11, it is also possible to use an Externally-connected Speaker and Mic 12, a Headset-type Speaker and Mic 13, or a Handset-type Speaker and Mic 14, by connecting into the speaker and mic connecters with the PC, accordingly in consideration of ease of use.

When the general-purpose computer is started up by the method of CD-ROM boot, the important point is the BIOS setup for the general-purpose computer. Recently, most of the PCs are originally set for the CD-ROM boot. The PC is started up with the HDD, only when no CD-ROM is mounted in the CD-ROM drive. However, in case of old PCs, it is necessary to set a higher priority for the CD-ROM boot.

The CD-IP telephone terminal in this embodiment is workable only when the CD-ROM boot is selected in the BIOS setup for the general-purpose computer. Since all necessary programs are written on the CD-ROM, the programs cannot be erased and the CD-IP telephone terminal can run without an HD drive.

Further, as shown in FIG. 2, it is required for an ADSL modem or a broadband router to have a DHCP server function and an UPnP server function. Since plural CD-IP telephone terminals are located under the broadband router, the IP addresses are dynamically assigned by the DHCP function. At the same time, both of a global IP address and a local IP address are obtainable so that voice packets are available on LAN (Local Area Network) after the packets' entering from the Internet Network 5. In the same reason, an ADSL model with a built-in broadband router function is also possible to use.

Next, in reference to FIGS. 3 to 5, the functionality will be described about the Next-Generation IP Telephone System S when a general-purpose computer being started by the CD-ROM boot.

FIG. 3A shows a flowchart of a processing in the general-purpose computer. FIG. 3B shows a flowchart of a processing in the CD-IP Telephone Control Management Server 6. FIG. 4 shows an example of data structure of a CD-IP Telephone Control Information Database 7 in the CD-IP Telephone Control Management Server 6. FIG. 5A shows an example of the initial log-in screen on the general-purpose computer, and FIG. 5B shows an example of an general browser screen on the general-purpose computer.

First of all, a user should confirm whether or not the General-Purpose Computer 2 has selected the CD-ROM as the highest boot priority in its BIOS when the user starts up the PC. If the CD-ROM is not the highest priority, the CD-ROM boot must be selected and saved, in order for the general-purpose computer to start up in the method of CD-ROM boot. The user will not be required to do the same setting after this time.

Next, when the user sets the CD-ROM 1 of the present invention in the CD-ROM drive of the General-Purpose Computer 2 and gives a startup instruction to the General-Purpose Computer 2 by turning on a power (or pressing the power button) or pressing the reset button, the CPU of the General-Purpose Computer 2 deploys the program and the data by way of CD-ROM boot, both of which are recorded on the CD-ROM (and both of which are read out by the CD-ROM drive), into the memory other than hard disk. Then, as shown in FIG. 3A, the General-Purpose Computer 2 (which includes the OS and a part of applications) is started up (in Step S1). Meanwhile, the applications include an application having a browsing function (hereinafter referred to as "browser") and an application having an IP calling function (hereinafter referred to as "soft phone"), and so on.

Thus, an initial login screen is displayed by the browser as shown in FIG. 3A (in Step S2). In this state of display, the user inputs the user ID and the password (uniquely assigned to every user) by operating the input means and clicks on the OK button, whereby the CPU of the General-Purpose Computer 2 recognizes the input (following "Y" in Step S3) and obtains the user ID and the password input through the input means. And thus, the obtained user ID and password is sent to the CD-IP Telephone Control Management Server 6 via the Internet Network 5 (in Step S4), based on the IP address known as location information, which is read out of the CD-ROM and stored into the memory, to represent the location of the CD-IP Telephone Control Management Server 6.

In response thereto, as shown in FIG. 3B, the CD-IP Telephone Control Management Server 6 receives the user ID and the password sent from the General-Purpose Computer 2 via the Internet Network 5 (in Step S11). Then (in Step S12), it is determined (or searched) whether or not the user ID and the password are registered (or actually exist) in the CD-IP Telephone Control Information Database 7.

If the user ID and the password are not registered (do not exist) in the CD-IP Telephone Control Information Database 7 (following "N" in Step S12), the CD-IP Telephone Control Management Server 6 sends (or returns) to the General-Purpose Computer 2 via the Internet Network 5 (in Step S13) with a piece of reject information to indicate that the user is not allowed to use, then the processing terminates.

Figure 4:
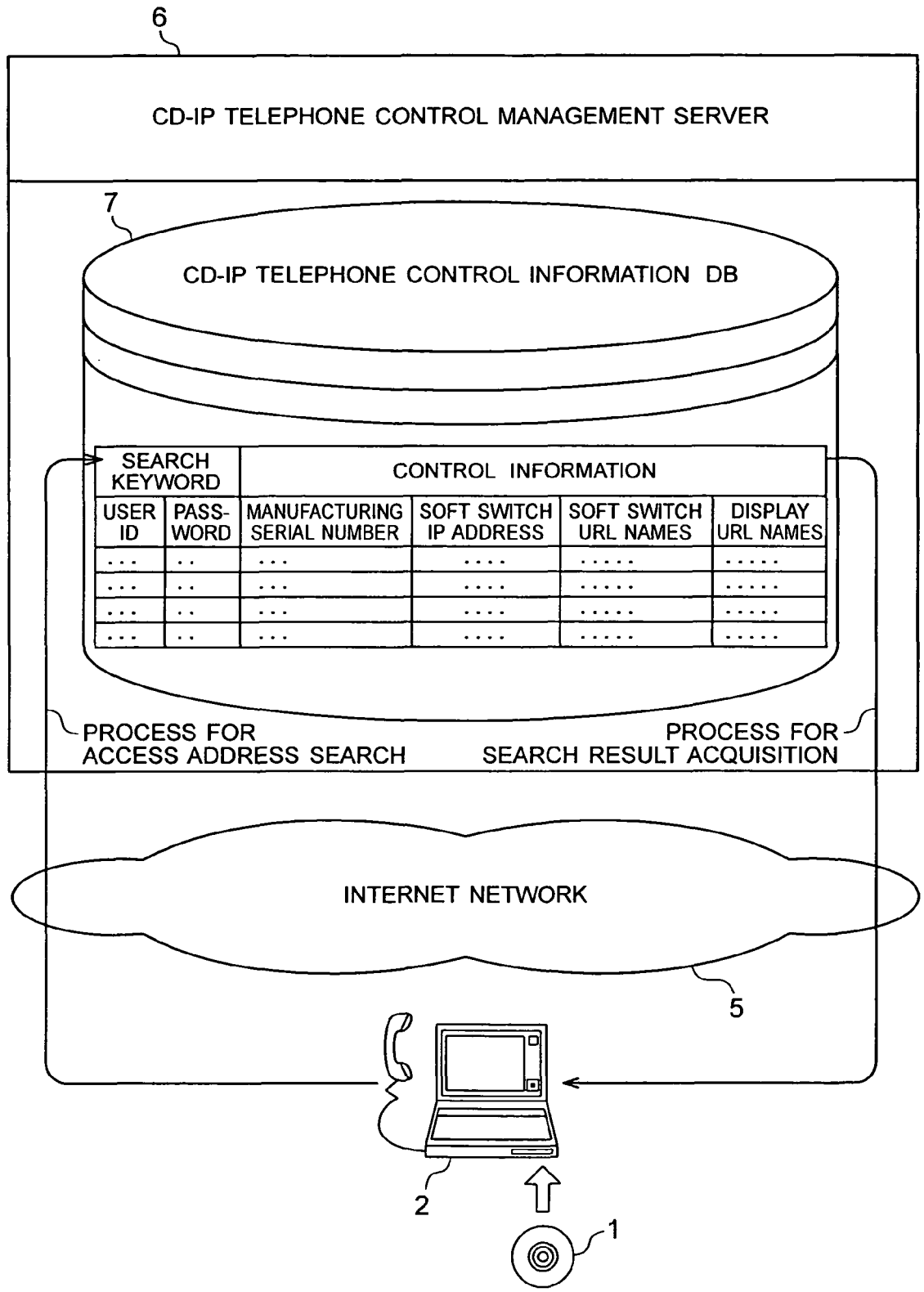
FIG. 4 is an example of a data structure of the CD-IP Telephone Control Information Database 7 in the CD-IP Telephone Control Management Server 6.
Figure 5A:
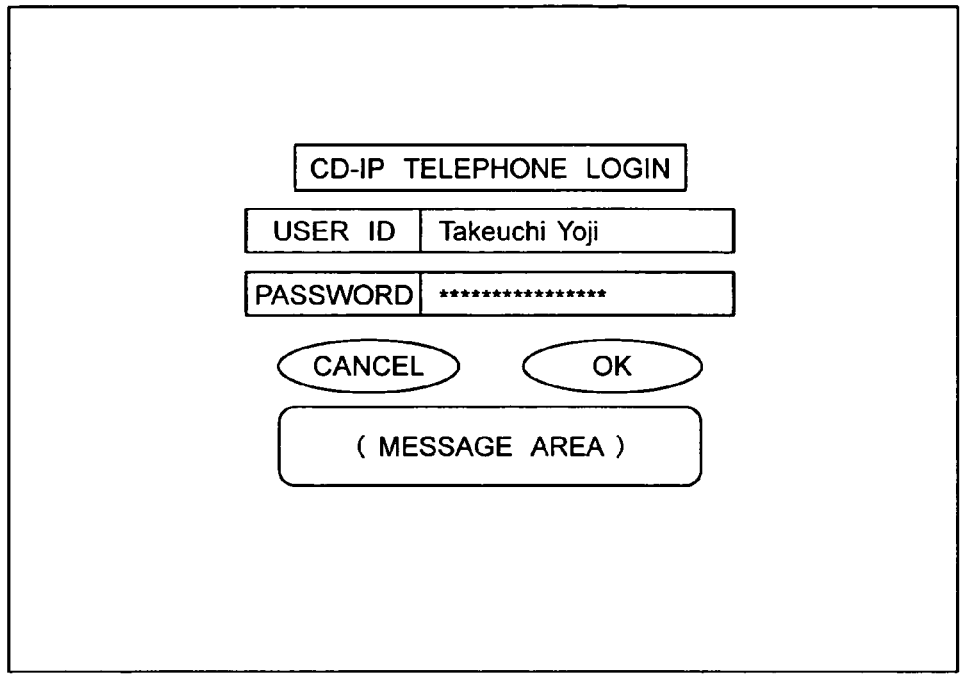
FIG. 5A is an example of an initial login screen for a general-purpose computer.
Figure 5B:
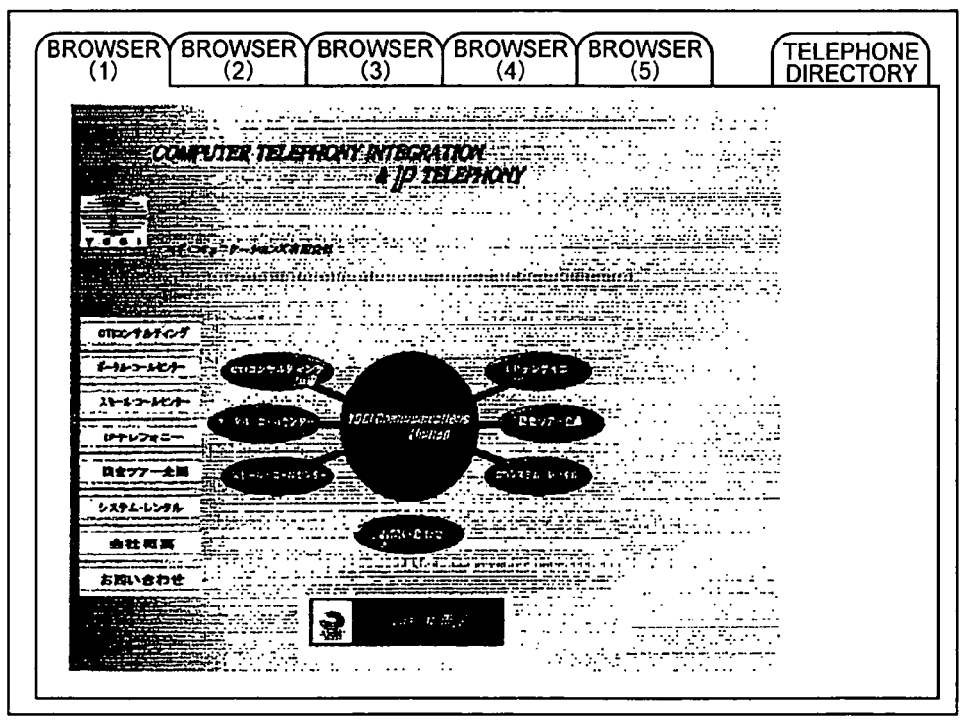
FIG. 5B is an example of a general browser screen of a general-purpose computer.

Meanwhile, if the user ID and the password are registered (or exist) in the CD-IP Telephone Control Information Database 7 (following "Y" in Step S12), as shown in FIG. 4, the CD-IP Telephone Control Management Server 6 obtains the manufacturing serial number uniquely corresponding to the user ID, the IP address of the Soft Switch Web Server 8, the URL name of the Soft Switch Web Server 8 and the URL name to display the page with, as the search result. Then, the CD-IP Telephone Control Management Server 6 further sends (or returns) the IP telephone terminal setup information being included as the search result, with the information transmission means to the General-Purpose Computer 2 via the Internet Network 5 (in Step S14). Then, the processing terminates.

To the contrary, the CPU of the General-Purpose Computer 2 receives the information sent from the CD-IP Telephone Control Management Server 6 via the Internet Network 5 (in Step S5), and determines whether or not the information is the IP telephone terminal setup information (in Step S6). If the information is not the IP telephone terminal setup information (following "N" in Step S6), in other words, if the information is the reject information not allowing the user to use, the reject information is displayed in a message area on the browser (in Step S7). Then, the processing returns to Step S2 and the initial login screen is re-displayed.

Meanwhile, if the received information is the IP telephone terminal setup information (following "Y" in Step S6), the CPU of the General-Purpose Computer 2 obtains the manufacturing serial number and the IP address as the location information showing the location of the Soft Switch Web Server 8, based on the search result for the IP telephone terminal setup information (in Step S8) and sends the manufacturing serial number to the Soft Switch Web Server 8 via the Internet Network 5 following the IP address (which is the global IP address) (in Step S9).

By the way, there are plural URL names in the received search result. These are provided to display Web sites on the browser in the CD-IP telephone terminal. On the CD-IP telephone terminal, Web sites respectively are displayed by the browser corresponding to the tubs on a general browser screen as shown on the FIG. 5B. On The general browser screen, there is another screen equivalent to a "telephone directory" which functions to make an outgoing call on the screen itself instead of using a telephone number.

Next, in reference to FIGS. 6 to 8, a functional operation of the Next-Generation IP Telephone System S will be described for the time when the CD-IP telephone terminal is set up.

Figure 6A:
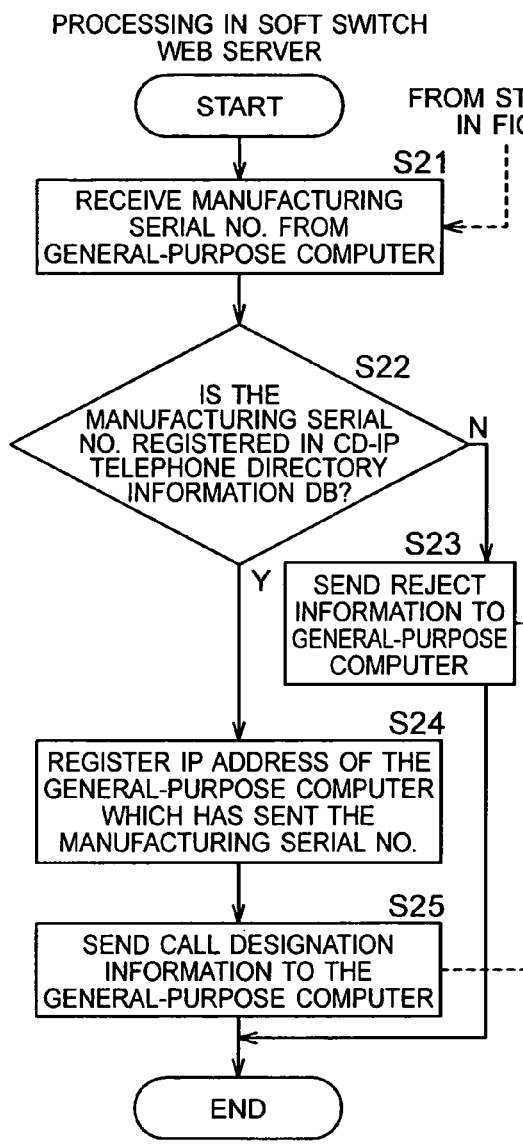
FIG. 6A is a flowchart showing a processing for a Soft Switch Web Server 8.
Figure 6B:
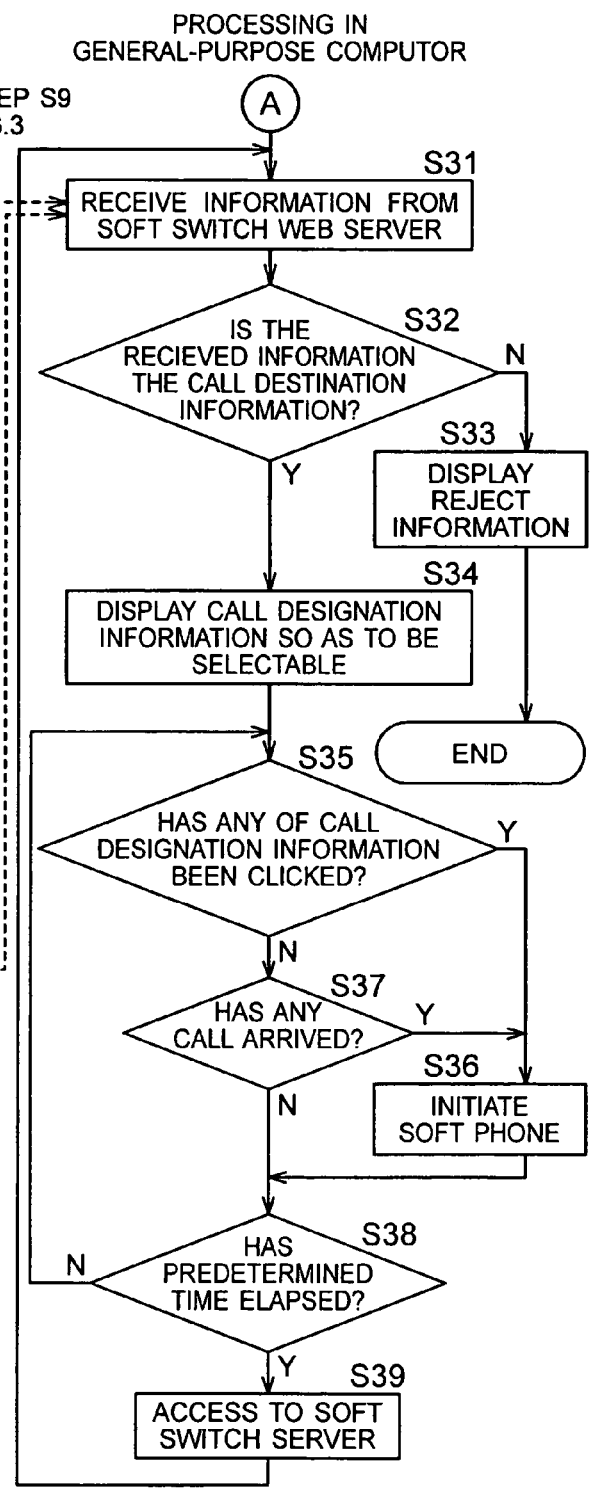
FIG. 6B is a flowchart showing a processing for a general-purpose computer.

FIG. 6A is a flowchart showing the processing in the Soft Switch Web Server 8 and FIG. 6B is a flowchart showing the processing in the general-purpose computer. FIG. 7 shows an example of the data structure of the CD-IP Telephone Directory Information Database 17 in the Soft Switch Web Server

8. FIG. 8 shows an example of telephone directory screen on the general-purpose computer after it is set up as the CD-IP telephone terminal.

As shown in FIG. 6A, the Soft Switch Web Server 8 receives the manufacturing serial number sent from the General-Purpose Computer 2 via the Internet Network 5 (in Step S21) and determines (or searches) whether or not the manufacturing serial number is registered (or exists) in the CD-IP Telephone Directory Information Database 17 (in Step S22).

If the manufacturing serial number is not registered (or does not exists) in the CD-IP Telephone Directory Information Database 17 (following "N" in Step S22), the Soft Switch Web Server 8 sends back (or returns) the reject information representing that the user is not allowed to use, to the General-Purpose Computer 2 via the Internet Network 5 (in Step S23) and then the processing terminates. Since the CD-IP Telephone Directory Database 17 is inherently associated with the CD-IP Telephone Control Information Database 7, it is difficult to imagine that the manufacturing serial number does not exist in the directory database. However, there may occur such event that the serial number is not found registered due to the inconsistency between those databases.

Meanwhile, if the manufacturing serial number is registered (or exists) in the CD-IP Telephone Directory Information Database 17 (following "Y" in Step S22), the Soft Switch Web Server 8 conducts a registration as a registering means (in other words, registers the General-Purpose Computer 2 as the CD-IP telephone terminal) with the IP address of the General-Purpose Computer 2 which has sent the manufacturing serial number (or in short, the general-purpose computer which is currently connected), onto the IP address field (which is the Part 51 in the FIG. 7 for example) which is associated to the manufacturing serial number on the CD-IP Telephone Directory Information Database 17 (in Step S24). Thus, the General-Purpose Computer 2 is set up into the IP telephone terminal.

Figure 7:
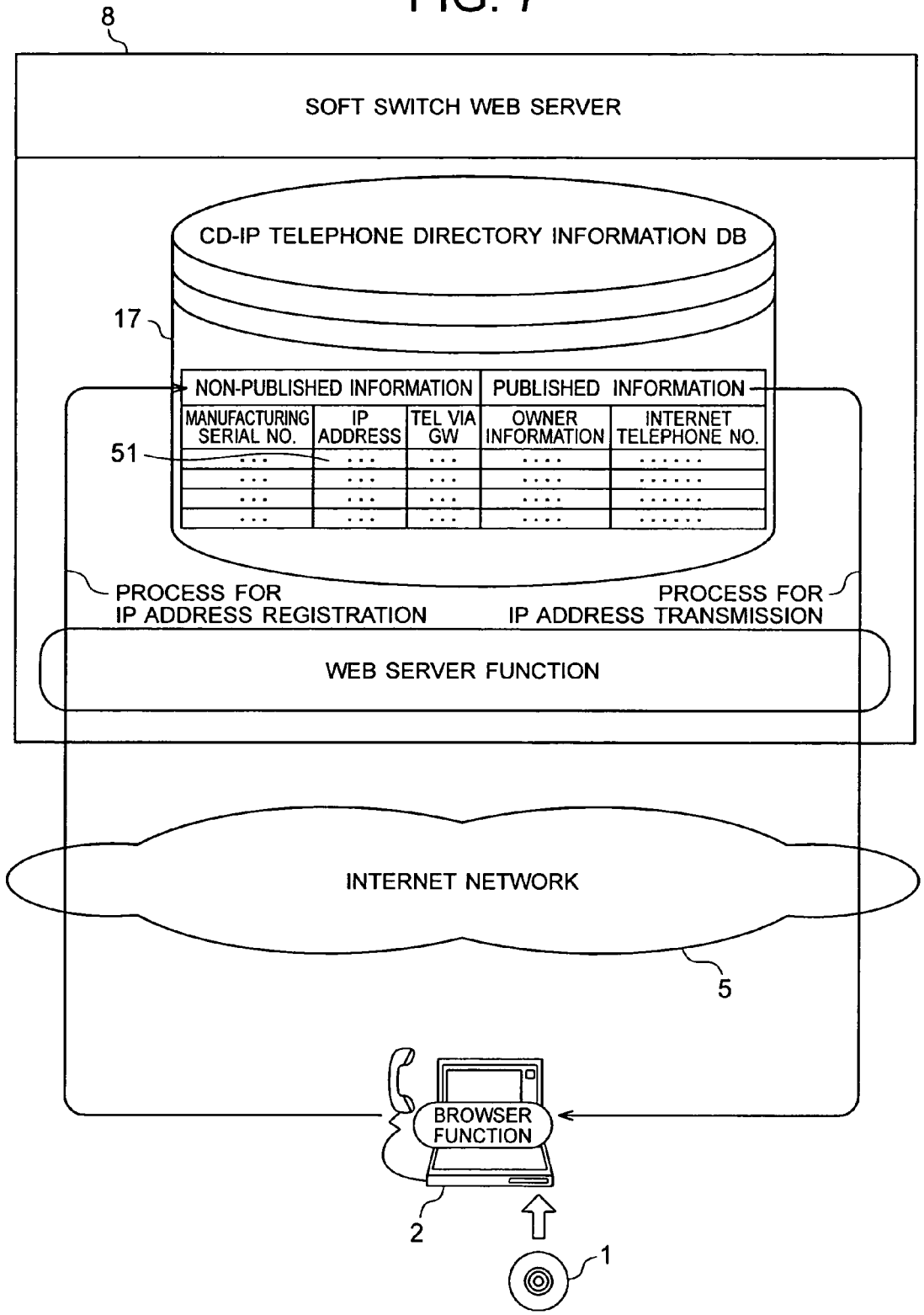
FIG. 7 is an example of a data structure of the CD-IP Telephone Directory Information Database 17 in the Soft Switch Web Server 8.

The IP address field in FIG. 7 is an item being frequently updated among the fields in the CD-IP Telephone Directory Information Database 17. The owner information is updated only when the owner (a user for example) is changed. There is no chance for the manufacturing serial number and the Internet telephone number to be changed.

As described above, when the General-Purpose Computer 2 is registered as a CD-IP telephone terminal, the Soft Switch Web Server 8 conducts a transmission via the Internet Network 5 (in Step S25) with the call designation information including the owner information which was registered in the CD-IP Telephone Directory Database 17, for example, as published information (referred in FIG. 7) as well as the Internet telephone number, toward the General-Purpose Computer 2 which was registered as the CD-IP telephone terminal. Then the processing terminates.

After this point of timing, whenever the access is made from the General-Purpose Computer 2 for the purpose of the IP address re-registration, the processing of Step S24 and Step S25 is supposed to repeat although the processing is not shown in the figures.

On the other hand, the CPU of the General-Purpose Computer 2 which was set as a CD-IP telephone terminal receives the information sent from the Soft Switch Web Server 8 via the Internet Network 5 (in Step S31) as shown in FIG. 6B (which is continued from the circle "A" endpoint on FIG. 3A). And the CPU determines whether or not the information is a call designation information data (in Step S32). If it is not the call designation information (following "N" in Step S32), namely it is the reject information representing that the use is not allowed, the reject information is displayed on the browser (in Step S33). Then the processing terminates.

Meanwhile, the received information is the call designation information (following "Y" in Step S32), the CPU of the General-Purpose Computer 2 displays the call designation information on its browser (in Step S34), making the user being able to select with the input means.

FIG. 8A shows an example of thus displayed telephone directory screen.

The call-making operation with the General-Purpose Computer 2 set as a CD-IP telephone terminal is conducted by the user with the input means by selecting a desirable call designation information data on the telephone directory screen, as shown in FIG. 8A for example, (which can be a "subscriber" name of the registered user of CD-IP telephone terminal or a Internet telephone number itself, or a name of a public stationed telephone subscriber (via a IP gateway) or a public stationed telephone number itself via IP gateway, for example). Specifically, when the call designation information is clicked by a mouse for example, the CPU of the General-Purpose Computer 2 recognizes the event (following "Y" in Step S35). The CPU obtains the clicked call designation information and initiate the soft phone (in Step S36). Thus, it becomes possible by only clicking on the screen, for example, to make a direct outgoing call to the CD-IP telephone terminal registrant, to make a call to a public stationed telephone via the IP gateway 9, to make a call to an internal extension of the PBX connected via the IP gateway 9 and so on, via the Internet Network 5.

Further, when a call arrives either from the CD-IP telephone directly or a public stationed telephone via the IP Gateway 9 over the Internet Network 5, the CPU of the General-Purpose Computer 2 recognizes the event (following "Y" in Step S37) and initiates the soft phone (in Step S36).

When the soft phone gets started up, as shown in FIG. 8B for example, a CD-IP telephone outbound/inbound control screen 61 (called the Soft phone screen) is displayed near by the relevant call designation information. The CD-IP Telephone Inbound/Outbound Call Control Screen 61 has the "Call" Button 61a for answering a call, the "End" Button 61b for hunging up the call, and the Volume Control Bars 61c and 61d for a speaker and a mic. While the CD-IP Telephone Inbound/Outbound Screen 61 is displayed, IP call conversation is possible. When the call ends, the soft phone terminates and the processing moves to the Step S38. Because the IP call is publicly well known in terms of usage after the softphone is started, a detailed description is omitted.

Further, in case of the CD-IP telephone terminal similar to the cellular phone, there can be a situation that the CD-IP telephone terminal may not be connected to the network. In this situation, the processing may not reach the ringing status (or the status of making a sound at the terminal).

Further, when the CPU of the General-Purpose Computer 2 spends a certain amount of time (for example, about five minutes being optionally preset), for example, after receiving the call designation information (following "Y" in Step S38), the CPU accesses to the Soft Switch Web Server 8 (in Step S39) for the purpose of re-registering its IP address. By doing this, the browser screen will be updated (or refreshed) on the telephone directory screen as shown in FIG. 8A at a predetermined time interval.

Example

Next, an usage case will be described in reference to FIG. 2, for example of utilization, starting with the CD-ROM boot in a PC, accessing to the CD-IP Telephone Control Management Server 6, accessing to the Soft Switch Web Server 8, and up to completing the CD-IP telephone terminal setup.

First, the CD-ROM 1 of the present invention is set in the CD-ROM drive of a PC, to make the PC itself the dedicated CD-IP Telephone Terminal 2, by initiating the PC by the CD-ROM boot method. Because the necessary software is always the OS and the programs on the CD-ROM for setting up the IP telephone terminal, the PC gets workable without the HD drive.

Various connectivity interfaces modes are available for the CD-IP Telephone Terminal 2 to access the CD-IP Telephone Control Server 6 via the Internet Network 5. However, the most typical interface mode is ADSL connection. In many cases, an ADSL modem is provided to connect to a line from a provider and a broadband router is connected further from the ADSL modem. In this case, if UPnP is supported by the router, plural CD-IP telephone terminals can be connected under the router. If DHCP is supported by the router, it is unnecessary for the CD-IP telephone terminal to have a fixed IP address.

As the initial start-up goes on, the initial log-in screen is displayed. When the user inputs the user ID and password on the screen, the terminal can obtain the manufacturing serial number from the CD-IP Telephone Control Management Server 6, which is a unique ID assigned to each of the CD-IP telephone terminals. Based on the unique ID, the terminal can access to the Soft Switch Web Server 8. In general, in order to operate and manage H.323 terminals, the H.323 GK specifications are used in many cases being recommended by ITU-T (International Telecommunication Union Telecommunication Standardization Sector). However, in this embodiment, proprietary specifications are used in the soft switch.

In this embodiment, although the softphone application on the CD-IP telephone terminal complies with H.323 specification, the softphone does not use the general GateKeeper but it uses the Soft Switch Web Server which has a Web server function, so that a mechanism is realized to operate a PC for the telephone switching. Furthermore, it is general that an IP phone terminal normally conducts a direct access to a GateKeeper. However, in case of the CD-IP telephone terminal, it obtains the manufacturing serial number of a unique ID via the CD-IP Telephone Control Management Server 6 for the first step and then it accesses to the Soft Switch Web Server 8 for the next step. The processing of those two steps is a feature of the CD-IP telephone terminal.

On completion of starting up the CD-IP Telephone Terminal 2, the PC itself becomes a dedicated terminal of IP telephone with a dedicated browsing function, so that any functions related to the OS are not displayed on the screen at all. Further, only when clicking for an outgoing call on the telephone directory screen or only when receiving an incoming call, the softphone screen appears as shown in FIG. 8B with Part 61.

The softphone screen has the "Call" and "End" buttons to conduct a basic operation. The "Call" button can answer an incoming call and the "End" button can terminate an ongoing call. By clicking on the screen to start a setup for a outgoing call, the Central Telephone Image Part 61e begins blue-blinking. Then, it changes into fixed-blue color when the called party answers the call. By having an incoming call, the telephone image part has red-blinking while it is possible to answer the call by clicking the "Call" button.

Further, an IP gateway can work as well, so that the gateway makes it possible to make a call to the public stationed telephone network, to receive an incoming call from the public stationed telephone network, and so on. However, for making a call via gateway, required is either a public stationed telephone number (which is a telephone number via gateway) as the additional information for the gateway, or an extension number of PBX connected.

Further, in case of an incoming call via gateway, when making a call from the public stationed telephone network to the IP gateway, the dialing party, prior to the dialing, must know the Internet telephone number to be dialed.

In terms of usage to utilize the unique ID with the manufacturing serial number which is not written on the HD, there is a featuring structure in integrating the browsing function with the IP telephone function on the CD-bootable OS deployed in the memory area, in order to realize CD-IP telephone functions such as a function to display the to-be-dialed parties by use of the browser and a function to enable an outgoing call by selectively clicking the to-be-dialed party on the displayed screen.

Especially described as a characteristic featuring point should be the software integration structure. The features are explained in reference to FIG. 9A.

FIG. 9A shows an example of the software integration structure.

Based on the PC hardware being used as a device, a mechanism is realized among software layers, whereon the basic Operating System works on the basic software layer, whereon the softphone works on the middle layer above the basic layer, and whereon the browser works on the uppermost layer above the middle layer. In this structure, a characteristic integration methodology on each layer will be described layer by layer.

First, the feature on the basic Operating system layer is that the environment prevents the OS from writing. In general, the OS being installed on a Hard Disk drive such as Microsoft "Windows" (registered trademark) is permitted to write. If a specific unique ID is required for an application working in such an environment to have, the application can leave an individualized record by simply writing a required ID. In the present invention, however, the CD-ROM boot method is employed and an HD drive is not used. Therefore, the data-recording in a storage is impossible in this environment.

On the premise that the CD-ROM boot method does not allow writing on the OS, the softphone is running on the intermediate layer over the OS layer. Generally in case of an IP telephone software, some kind of individual ID is required to realize a function to receive an incoming call. In this invention, however, since no Hd drive is used, it is not allowed to write a specific ID. In order to realize the individual identification, the PC jointly works with the CD-IP Telephone Control Management Server 6, so that the IP telephone function can be achieved.

Further, the browser is functioning on the uppermost layer above the middle layer. The browser effectively works to display various situations on the screen, including the above-mentioned contents of the database. The controls of the softphone such as startup and termination are managed through the browser. The call designation information such as the called party owner information is provided by the Soft Switch Web Server 8 and is displayed through the browser. And at the same time, an outgoing call can be made from the IP telephone by only clicking on the browser screen, due to the integration between the browser and the softphone.

In the present invention, the Soft Switch Web Server 8 is prepared for the purpose of realizing the operational functions of making-call and receiving-call after the CD-IP telephone terminal is started up. Although the soft switch server is equivalent to GateKeeper of the standard H.323 protocol, in case of the CD-IP telephone terminal, the browser is integrated on the uppermost software layer and the telephone switching function is realized based on the web server unlike the GateKeeper. Due to this featuring structure, an advantage can be obtained in registering the CD-IP telephone terminals with no limit in its number.

The CD-IP telephone terminal integrated with the browser can be launched or terminated by the Soft Switch Web Server 8 in the programming description by HyperText Markup Language (HTML). However, the CD-IP telephone terminal does not necessarily require the inter-working with the Soft Switch Web Server 8. By obtaining from the browser the IP address of a destination party to call, it is possible to directly make an outgoing call or directly receive an incoming call. Accordingly, even though the database is not equipped in the Soft Switch Web Server 8, it is possible to let the CD-IP telephone terminal make an outgoing call by describing a specific IP address in HTML.

Described next is the integration method by which a call can be made by clicking on a designated party displayed on the browser screen in reference to FIG. 9B.

FIG. 9B shows an example of HTML description for making an outgoing call.

Any of favorite designs can be employed in accordance with HTML description. However, a telephone directory display design will be shown as a sample.

By clicking on a telephone image on the "telephone directory" tub, the description specified in the speech balloon is obtained so that the softphone is started up being triggered by the description, whereby an IP call is made in compliance with H.323 without the GateKeeper.

As shown in FIG. 9B, when the called destination party is a CD-IP telephone terminal, only a global IP address is added following an "@" mark. When the called destination party is a call center, a global IP address is added following an "@" mark being followed by the "/" with an internal extension number of the PBX connected. When the called destination party is either a cellular phone or a public stationed telephone, a global IP address is added following an "@" mark being followed by the "/" with a public stationed telephone number for the public stationed telephone network.

When an outgoing call is launched or an incoming call is received, the softphone displays a softphone screen which makes possible to answer the call, to terminate the call, to adjust the speaker volume, and to adjust the microphone volume. After completing the call, the softphone screen disappears.

As described so far, there are the features in this integration, that make the database in the Soft Switch Web Server 8 accessible in the configuration of Web/browser in compliance with HTML, and moreover, that make the browser trigger a call with a click on its screen.

Next, as a supplement, a description will be added regarding the UPnP support in reference to FIG. 10.

FIG. 10 shows an example of schematic picture with UPnP support.

Since the above-mentioned CD-IP terminal supports the UPnP, the IP call is possible even under a broadband router. As shown in FIG. 10A, because the IP addresses are differently assigned between under a global IP address environment on the Internet network and under a local IP address environment on LAN (Local Area Network), the voice from IP telephone cannot go through in the call without changing the IP address, in general.

For example, without UPnP support, the voice packets sent from the CD-IP telephone terminal go out to the Internet network holding the local IP address in them, so that there may occur a situation that the voice from the other party on the gateway side cannot reach back to the terminal and eventually the voice does not come out. In reference to FIG. 10A, the voice reaches at the gateway, which means that the voice can be heard on the gateway side, but a voice from the gateway cannot be heard on the CD-IP telephone terminal side.

Next, in case that the UPnP is supported as shown in FIG. 10B, because the packets go out into the Internet network with the global IP address being held, a bi-directional talking is possible reaching up to the broadband router. This is the same functionality as the general Web browsing. As the result, it is possible to hear a voice from the gateway. Specifically describing, it is necessary for the CD-IP telephone terminal to obtain the global IP address information from the broadband router and to embed the information into the voice packets, at all time.

As one way of embedding the global IP address, the UPnP function is a possibility. In general, the broadband router has the UPnP server function and can provide both of the global IP address on the Internet network and the local IP address on the LAN, in the format of Extensible Markup Language (XML) file. The softphone on the CD-IP telephone terminal parses (or analyzes texts of) the XML file gotten from the router to obtain the IP address information and to embed the information in the voice packets. Thus the bi-directional talking becomes possible (as shown in FIG. 10B).

According the present invention, there are at least three types of industrial applicability, i.e. a terminal with IP phone functionality to search for a product for a catalogue shopping company, a terminal for foreign students to make an overseas call free of charge, a terminal for in-house operators working for a call center, and more. Detail will be described below.

In case of the mail order business known as catalogue shopping, the company should print a large number of catalogue magazines requiring a high production cost. Also telephone charges are high for taking orders via phone calls. In such cases, it is possible to drastically reduce the printing costs of magazines and the telephone charge of the called-party billing, by using the CD-IP telephone terminal. In other words, it is possible to show the commercial goods on the browser via the Internet, and at the same time, to change the use from the public stationed telephone calls to the IP telephone calls via the Internet.

Foreigners and foreign students living in Japan are increasing year by year. As a matter of course, communications with their families are indispensable. On the other hand, it is difficult for elderly parents to use a PC based on "Window" (registered trade mark). However, by turning on the power after setting up the CD-ROM of the present invention into the PC, the Internet telephone is easily workable. Since the browser function is equipped, the users can browse a homepage of the university and enjoy seeing the school scores of the children at the same time while talking on the IP telephone.

In a call center, operators get together at one center to work. In this case, however, commuting cost is essential and flexible working hour assignment is difficult to adjust. If the operator job can be brought to the in-house work, the operation costs for the call center are drastically reduced. By starting up the CD-IP telephone terminal at home, the operators can browse with their job screens and moreover can realize making toll-free calls with the IP telephone function. Thus, it is possible even for people who have little knowledge about PC such as housewives.

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2004-129001 filed on Mar. 30, 2004 and Japanese Patent Applications No. 2005-017111 filed on Jan. 25, 2005 including the specification, claims, drawings and summary are incorporated herein by reference in its entirety.

What is claimed is:

1. A CD-ROM having a program recorded to set up a general-purpose computer as an IP telephone terminal by using at least a CPU, a memory, an input means, a network card, a sound card, and a CD-ROM drive except a hard disk (HD) drive, comprising:
a part of said program for making the general-purpose computer get started by initiating the general-purpose computer with the CD-ROM set at the CD-ROM drive to deploy the program recorded on the CD-ROM over the memory by a CD-ROM boot method without the hard disk drive;
wherein a unique manufacturing serial number has been originally pre-assigned to the CD-ROM even when the CD-ROM has been duplicated,
a part of said program for making the general-purpose computer obtain a user identification data which respectively corresponds to users and which is inputted by a user through the input means;
a part of said program for making the general-purpose computer send thus obtained user identification data to a management server via a network, based on a first location data recorded on the CD-ROM to designate a location of the management server;
wherein the management server has a database for registering a plurality of the user identification data and the manufacturing serial number corresponding to each respective user identification data, an obtaining device for obtaining from the database the manufacturing serial number corresponding to the user identification data sent from the general-purpose computer, and a sending device for sending an IP telephone terminal setup data including the obtained manufacturing serial number to the general purpose computer via the network;
a part of said program for making the general-purpose computer receive the IP telephone terminal setup data sent from the management server via the network; and
a part of said program for making the general-purpose computer function as a dedicated purpose terminal for IP telephony by setting up the general-purpose computer as the IP telephone terminal without the HD drive,
wherein a second location data is included in the IP telephone terminal setup data, in order for designating a location of an operation server used for telephone switching, and further including:
a part of said program for making the general purpose computer send the manufacturing serial number included in the IP telephone terminal setup data to the operation server via the network, based on the second location data in order to register the general-purpose computer as the IP telephone terminal.

2. The CD-ROM according to claim 1, further comprising:
a part of said program for making the IP telephone terminal obtain from the operation server a call designation data for designating either another IP telephone terminal which is connected to the network and registered in the operation server or a public stationed telephone which is connected to the network via a gateway and registered in the operation server; and
a part of said program for making the IP telephone terminal display the call designation data on its browser, in order for the user to be able to select the call designation data with the input means.

3. The CD-ROM according to claim 1, further comprising a part of said program for making the IP telephone terminal show a dummy display to make the IP telephone terminal setup data unreadable.

4. An IP telephone system comprising:
a general purpose computer;
a management server that receives a data from said general purpose computer;
an operation server that receives data from said general purpose computer; and
a CD-ROM having a program recorded to set up the general-purpose computer as an IP telephone terminal by using at least a CPU, a memory, an input means, a network card, a sound card, and a CD-ROM drive except a hard disk (HD) drive, the CD-ROM comprising:
a part of said program for making the general-purpose computer get started by initiating the general-purpose computer with the CD-ROM set at the CD-ROM drive to deploy the program recorded on the CD-ROM over the memory by a CD-ROM boot method without the hard disk drive, wherein a unique manufacturing serial number has been originally pre-assigned to the CD-ROM even when the CD-ROM has been duplicated,
a part of said program for making the general-purpose computer obtain a user identification data which respectively corresponds to users and which is inputted by a user through the input means;
a part of said program for making the general-purpose computer send thus obtained user identification data to the management server via a network, based on a first location data recorded on the CD-ROM to designate a location of the management server;
wherein the management server has a database for registering a plurality of the user identification data and the manufacturing serial number corresponding to each respective user identification data, an obtaining device for obtaining from the database the manufacturing serial number corresponding to the user identification data sent from the general-purpose computer, and a sending device for sending an IP telephone terminal setup data including the obtained manufacturing serial number to the general purpose computer via the network;
a part of said program for making the general-purpose computer receive the IP telephone terminal setup data sent from the management server via the network; and
a part of said program for making the general-purpose computer function as a dedicated purpose terminal for IP telephony by setting up the general-purpose computer as the IP telephone terminal without the HD drive,
wherein a second location data is included in the IP telephone terminal setup data, in order for designating a location of the operation server used for telephone switching, and further including a part of said program for making the general purpose computer send the manufacturing serial number included in the IP telephone terminal setup data to the operation server via the network, based on the second location data in order to register the general-purpose computer as the IP telephone terminal,
wherein the operation server connected via the network to the general-purpose computer started up by the CD-ROM comprises:

an operation server database for registering a plurality of the manufacturing serial number and call designation data corresponding to each of the manufacturing serial number; and wherein the operation server receives the manufacturing serial number sent from the general-purpose computer via the network so as to register the general-purpose computer as the IP telephone terminal when the manufacturing serial number is registered in the database.

5. The system according to claim 4, wherein the operation server further comprises:

transmission means of the call designation data for sending the call designation data registered in the operation server database via the network toward the general-purpose computer registered as the IP telephone terminal.

6. The system according to claim 5, wherein the CD-ROM comprises:

a part of said program for making the IP telephone terminal obtain from the operation server said call designation data for designating either another IP telephone terminal which is connected to the network and registered in the operation server or a public stationed telephone which is connected to the network via a gateway and registered in the operation server; and a part of said program for making the IP telephone terminal display the call designation data on its browser, in order for the user to be able to select the call designation data with the input means.

7. The system according to claim 6, wherein the operation server further comprises:

transmission means of the call designation data for sending the call designation data registered in the operation server database via the network toward the general-purpose computer registered as the IP telephone terminal.

8. An IP telephone system comprising:

a general purpose computer;

a management server that receives data from said general purpose computer;

an operation server that receives data from said general purpose computer; and a CD-ROM having a program recorded to set up the general-purpose computer as an IP telephone terminal by using at least a CPU, a memory, an input means, a network card, a sound card, and a CD-ROM drive except a hard disk (HD) drive, the CD-ROM comprising:

a part of said program for making the general-purpose computer get started by initiating the general-purpose computer with the CD-ROM set at the CD-ROM drive to deploy the program recorded on the CD-ROM over the memory by a CD-ROM boot method without the hard disk drive; wherein a unique manufacturing serial number has been originally pre-assigned to the CD-ROM even when the CD-ROM has been duplicated, a part of said program for making the general-purpose computer obtain a user identification data which respectively corresponds to users and which is inputted by a user through the input means;

a part of said program for making the general-purpose computer send thus obtained user identification data to the management server via a network, based on a first location data recorded on the CD-ROM to designate a location of the management server;

a part of said program for making the general-purpose computer receive IP telephone terminal setup data sent from the management server via the network; and a part of said program for making the general-purpose computer function as a dedicated purpose terminal for IP telephony by setting up the general-purpose computer as the IP telephone terminal without the HD drive, wherein the management server connected to the general-purpose computer via the network, which are started up by the CD-ROM comprises:

a database for registering a plurality of the user identification data and the manufacturing serial number corresponding to each respective user identification data; and, wherein the management server receives the user identification data sent from the general-purpose computer via the network, wherein the management server obtains from the database the manufacturing serial number respectively corresponding to the user identification data, wherein the management server sends to the general-purpose computer via the network the IP telephone terminal setup data including the manufacturing serial number and, wherein a second location data is included in the IP telephone terminal setup data, in order for designating a location of the operation server used for telephone switching, and further including:

a part of said program for making the general purpose computer send the manufacturing serial number included in the IP telephone terminal setup data to the operation server via the network, based on the second location data in order to register the general-purpose computer as the IP telephone terminal.

9. The system according to claim 8 wherein the CD-ROM comprises:

a part of said program for making the IP telephone terminal obtain from the operation server a call designation data for designating either another IP telephone terminal which is connected to the network and registered in the operation server or a public stationed telephone which is connected to the network via a gateway and registered in the operation server; and a part of said program for making the IP telephone terminal display the call designation data on its browser, in order for the user to be able to select the call designation data with the input means.

10. An IP telephone terminal setup method to register as an IP telephone terminal using a general-purpose computer including at least a CPU, a memory, an input means, a network card, a sound card, and a CD-ROM drive except a HD drive, comprising steps of:

making a CD-ROM be set at the CD-ROM drive to allow the general-purpose computer to function as the IP telephone terminal with a program recorded on the CD-ROM without using a hard disk, wherein a unique manufacturing serial number has been originally pre-assigned to the CD-ROM even when the CD-ROM has been duplicated;

making the general-purpose computer start to deploy the program recorded on the CD-ROM over the memory without a hard disk in the way of CD-ROM boot at the timing of command to initiate the general-purpose computer;

making the general-purpose computer obtain a user identification data corresponding to respective users, which is inputted by a user through the input means;

making the general-purpose computer send thus obtained user identification data to a management server via a network, based on a first location data recorded on the CD-ROM as a location information of the management server, wherein the management server has a database for registering a plurality of the user identification data and the manufacturing serial number corresponding to each respective user identification data;

making the management server receive the user identification information sent from the general-purpose computer via the network;

making the management server obtain from the database the manufacturing serial number corresponding to the received user identification data;

making the management server send an IP telephone terminal setup data including the obtained manufacturing serial number and a second location data designating a location of an operation server to conduct a telephone switching processing to the general-purpose computer via the network;

making the general-purpose computer receive the IP telephone terminal setup data sent from the management server via the network;

making the general-purpose computer send the manufacturing serial number included in the IP telephone terminal setup data to the operation server via the network based on the second location data; and making the operation server register an IP address of the general-purpose computer onto an IP address field which is associated to the manufacturing serial number on an IP telephone directory information database.

* * * * *